Oct. 6, 1953     T. W. BOHMKER     2,654,301
DRAFT CONTROL MECHANISM Filed May 23, 1946     3 Sheets-Sheet 2

INVENTOR
THOMAS W. BOHMKER
BY
ATTORNEYS

Oct. 6, 1953  T. W. BOHMKER  2,654,301
DRAFT CONTROL MECHANISM
Filed May 23, 1946  3 Sheets-Sheet 3

INVENTOR
THOMAS W. BOHMKER
ATTORNEYS

Patented Oct. 6, 1953

2,654,301

UNITED STATES PATENT OFFICE 2,654,301

DRAFT CONTROL MECHANISM

Thomas W. Bohmker, Geneseo, Ill., assignor to Deere & Company, Moline, Ill., a corporation of Illinois Application May 23, 1946, Serial No. 671,672

19 Claims. (Cl. 97—46.03)

The present invention relates generally to control mechanism and more particularly to mechanism for adjusting an agricultural implement, such as a ground working tool or the like, while the latter is controlled by a draft vehicle such as a tractor.

The principal object of the present invention is the provision of mechanism which will automatically adjust the implement to maintain the latter in proper operating position under varying draft conditions. More specifically it is a further object of my invention to provide control mechanism for raising and lowering a working tool under varying ground conditions to prevent overloading the tractor or vehicle while maintaining a maximum working effectiveness of the tool.

During operation of a tractor propelled tool, such as a plow or the like, the variation of ground conditions results in wide variations in the amount of draft force required to move the plow or other tool in the ground. For example, when the plow encounters dense or tightly packed soil conditions, it requires more draft force to move it through the dense soil at any given depth of operation than when the plow is operated at the same depth of operation in light soil conditions. Control mechanism is known in the art for balancing the draft force or tractive effort against a spring and then raising or lowering the plow-share or other ground working tool to maintain a substantially constant tractive effort. Thus, should the plow encounter an area of hard clay, the increased tractive effort required effects a response from the mechanism, which raises the plow to a depth at which the tractor can pull the plow with the predetermined value of tractive effort. Then, when the plow passes from the clay to a lighter or sandier soil condition, the tractive effort decreases, causing a further response from the mechanism, which lowers the implement to a depth of operation at which it requires the predetermined amount of tractive effort for its propulsion. This prevents the tractor from being overloaded in a manner similar to that used in manual operation. This type of mechanism however, does not solve the entire problem, for there are other factors besides the increasing of the draft force, which can result in the overloading of the tractor. For example, when plowing uphill, more power is required from the tractor engine to move the weight of the tractor itself, which reduces the amount of power available for propelling the plow. Conventional mechanisms do not take this factor into account, but maintain the same amount of tractive effort when plowing uphill as when plowing on level ground.

Another condition which prior art systems do not take into account is that which occurs when the tractor encounters a slippery spot in the field, resulting in increased wheel slipping. When the tractor wheels begin to slip, the tractive effort decreases which, in prior art systems, causes the depth of the plow to be increased, rather than decreased, and thus, the prior art systems fail entirely under such ground conditions, making it necessary to revert to manual operation in slippery ground conditions.

It is, therefore, one of the objects of my invention to provide control mechanism for raising and lowering a ground working tool responsive to conditions that result in a decrease in forward speed of the tractor, regardless of the cause of such conditions, whether it be from increased draft force required to draw the implement, from increased power requirements to move the tractor, such as when plowing uphill, or from slippery ground conditions that prevent the exertion by the tractor of its normal draft force on the plow.

In the accomplishment of these objects, my invention contemplates the use of control mechanism responsive to changes in the amount of slippage of the tractor wheels. Thus, by holding a substantially constant value of wheel slippage, or in other words, a constant difference between the speed of the tractor over the ground and the peripheral speed of the traction wheels, the tractor is prevented from overloading and stalling under any conditions of operation. For example, should the plow encounter a spot in which the soil is dense, the increased drag on the implement causes an increased wheel slippage, thereby resulting in a response from the mechanism which lifts the plow to a shallower operating depth until the slippage of the wheels is reduced to its predetermined value. Similarly, when plowing uphill, the increased power requirement for propelling the tractor up the hill causes an increase in wheel slippage and thereby calls for decreasing the depth of operation of the plow. Likewise, when the tractor encounters a slippery area, the wheel slippage increases, thereby resulting in the plow being raised until the wheel slippage is reduced to normal.

In a simplified form, my invention contemplates automatic control mechanism for raising and lowering the tool, responsive to changes in the forward speed of the tractor over the ground, to hold a substantially constant forward speed.

In this form of my invention, the implement is not raised to a shallower depth of operation so long as the speed of the tractor can be maintained at its normal value by the conventional tractor governor provided as standard equipment on most commercial tractors. Thus, the depth of operation of the plow or other tool is maintained constant until the forward speed of the tractor decreases, either by virtue of excessive wheel slipping or because of overloading of the tractor engine, either by increased draft due to dense soil conditions or by increased power requirement due to plowing uphill.

These and other objects and advantages of my invention will be apparent to those skilled in the art after a consideration of the following description, in which reference is had to the drawings appended hereto, in which.

Figure 1:
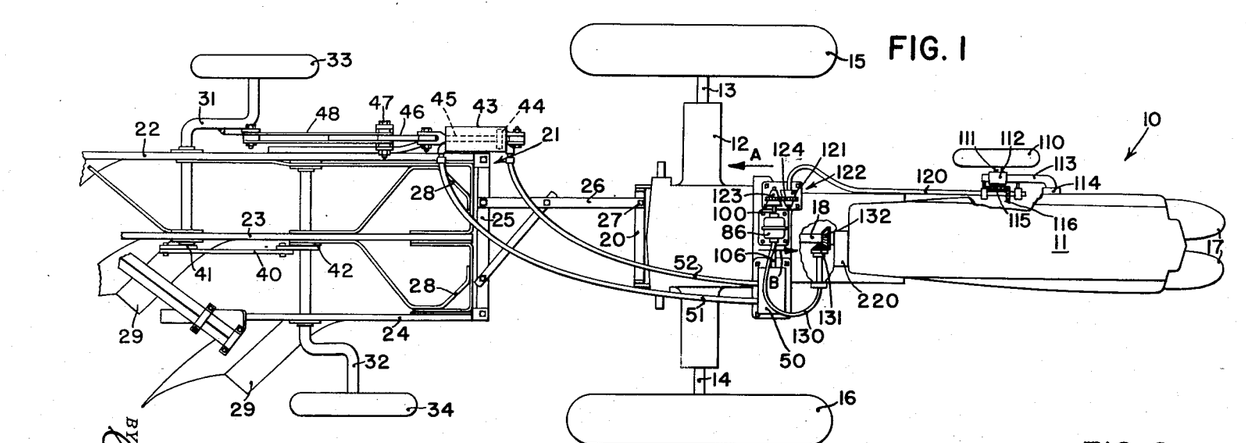
Figure 1 is a top plan view of a tractor and plow embodying the principles of the present invention.

Referring now to the drawings, the tractor is indicated in its entirety by reference numeral 10 and comprises a narrow longitudinally extending body 11 carried on a transverse rear axle housing 12, which is supported on drive axles 13, 14, to which are attached traction wheels 15, 16, respectively. The forward end of the body 11 is carried on a pair of closely spaced front dirigible wheels 17 in a manner well known to those skilled in the art. Power is transmitted from the engine of the tractor located on the body 11 to the two traction wheels 15, 16 by means of a longitudinally extending power shaft 18 which is connected to the two axles 13, 14 by conventional differential gear mechanism located in the transverse housing 12. The tractor is provided with a conventional drawbar 20, to which is connected a trailing implement, shown as a plow 21.

The plow 21 comprises three laterally spaced fore and aft extending beams 22, 23, 24 interconnected at their forward ends by a transverse beam 25, to which is connected a forwardly extending draft member 26. The draft member 26 is pivotally connected to the drawbar 20 by a hitch pin 27. The draft beams 22, 23, 24 are rigidly interconnected by suitable braces 28, which tie the draft beams together to form a rigid unitary frame. Each of the beams 22, 23, 24 carries a plowshare 29 at its rear end, in the usual manner.

The plow 21 is carried on a pair of transversely extending crank axles 31, 32, which are journaled on the plow frame and are carried on wheels 33, 34, respectively. The crank axles 31, 32 are interconnected by means of a link 40, which is pivotally connected to lever arms 41, 42 fixed to the axles 31, 32, respectively. This interconnection, as is well known to those skilled in the art, provides for simultaneous operation of the two crank axles when raising and lowering the plow.

The plow 21 is raised and lowered between operating and transport positions by power-actuated tool shifting means in the form of a hydraulic cylinder 43, within which is slidably disposed a piston 44 having a connecting rod 45 extending out of one end of the cylinder 43 and connected to a bell crank 46 pivotally mounted at 47 on the plow frame and having a link connection 48 with one of the crank axles 31. The plow is raised by extending the piston and cylinder assembly 43, 44, thereby swinging the crank axles downwardly to raise the plow frame 21. The depth of operation of the plowshares 29 can be controlled within a limited range of operation by means of the hydraulic cylinder.

The hydraulic cylinder 43 is controlled by mechanism which will be described later, contained within a control housing 50 mounted on the tractor, and is connected by means of a pair of flexible hoses 51, 52 to the control mechanism. The hoses 51, 52 are connected to the cylinder 43 at the front and rear ends thereof, respectively, for supplying fluid under pressure to the cylinder on either side of the piston 44, selectively, to raise and lower the plowshares during operation and also to raise the plow from operating position to transport position in a conventional manner.

Figures 3, 4:
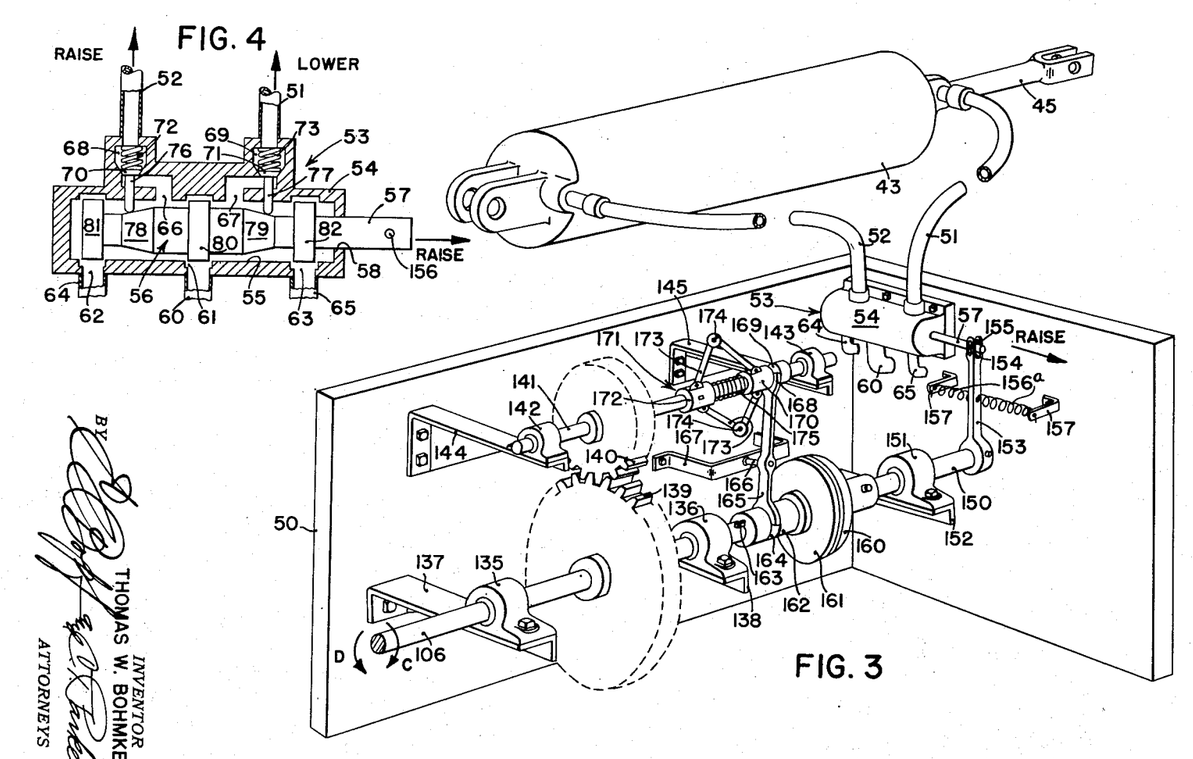
Figure 3 is a perspective view of the control mechanism embodied in the present invention.
Figure 4 is a sectional elevational view taken along the axis of the hydraulic control valve.

Fluid is supplied to the cylinder 43 through the hoses 51, 52 under control of a hydraulic control valve 53, which comprises a valve housing 54, within which is a cylindrical valve chamber 55, best shown in Figure 4. A valve member 56 is slidable axially within the chamber 55 and is provided with an actuating rod 57 extending outwardly of the casing 54 through an opening 58 in one end of the latter.

Fluid is supplied to the valve chamber 55 through a conduit 60, which is connected to any suitable source of fluid such as a fluid pump (not shown). The supply duct 60 is connected to a supply port 61 in the valve housing 54, substantially centrally located in the valve chamber 55. A pair of exhaust ports 62, 63 are connected through ducts 64, 65, respectively, with a fluid reservoir (not shown). The exhaust ports 62, 63 are spaced axially on opposite sides of the supply port 61, respectively. A pair of cylinder ports 66, 67 are disposed in communication with the valve chamber 55 on opposite sides, respectively, of the supply port 61, between the latter and the adjacent exhaust ports 62, 63, respectively. The cylinder ports 66, 67 communicate with a pair of check valve chambers 68, 69, within which are disposed poppet type check valves 70, 71, which normally block the passage between the associated cylinder port and the check valve chamber. A pair of compression springs 72, 73 are disposed in the check valve chambers 68, 69 and urge the check valves 70, 71 into closed position, respectively, to prevent fluid from flowing from either end of the cylinder 43 to the valve chamber 55. The check valves 70, 71 are provided with valve stems 76, 77, which extend through suitable apertures to the valve chamber 55, the valve stems 76, 77 bearing against outwardly tapering conical surfaces 78, 79 on the valve member 56, respectively. Thus, by shifting the actuating rod 57 the valve member 56 can be shifted axially within the cylinder 55 in two relatively opposite directions from the neutral position indicated in Figure 4, to open one or the other of the check valves 70, 71 by a camming action of the conical surface 78, 79 against the valve stems 76, 77, selectively.

In the neutral position of the valve member 56, the fluid is supplied through the conduit 60 and supply port 61 to the valve chamber 55 and is free to flow in both directions simultaneously to the two exhaust ports 62, 63, returning to the fluid reservoir through the exhaust ducts 64, 65. The valve member 56 is provided with a central portion 80, which is slidable within the valve chamber 55, but is narrower than the supply port 61, to permit a flow of the supply fluid in each direction in the chamber 55. A pair of pistons 81, 82 are also provided on the valve member 56 in outwardly spaced relation from the central portion 80 on opposite sides of the latter, respectively. The two pistons 81, 82 are disposed in spaced relation from the central portion 80 so that, in neutral position, the exhaust ports 62, 63 are uncovered, whereby the flow of fluid returns to the reservoir through the exhaust ducts 64, 65.

The operation of the valve 53 is as follows: By shifting the actuating rod 57 outwardly, or toward the right, as viewed in Figure 4, the piston portion 80 blocks the flow of fluid from the supply port 61 toward the exhaust port 63, and at the same time, the piston portion 81 blocks any flow of fluid from the valve chamber 55 to the exhaust port 62. The fluid supply from the port 61 forces the check valve 70 open against the spring 72 and passes through the flexible hose 52 to the cylinder 43, building up the pressure on one side of the piston 44 and urging the latter rearwardly, as viewed in Figure 1, thereby raising the plow by forcing the wheels downwardly relative to the plow beams. The fluid in the cylinder 43 on the opposite side of the piston is forced outwardly through the other hose 51 past the check valve 71, which has been forced open by the camming action of the conical surface 79 against the end of the valve stem 77. The fluid then flows through the cylinder port 67 out the exhaust port 63, and then returns to the reservoir through the duct 65.

Whenever the valve member 56 is returned to neutral position, the flow of fluid from the supply port 61 to the exhaust ports 62, 63 is reestablished, and the check valves 70, 71 are closed by the action of the springs 72, 73, thereby holding the plow in any desired position of adjustment.

The plow can be lowered by shifting the valve member 56 inwardly or to the left (see Figure 4), thereby blocking the flow of fluid from the supply port 61 through the valve chamber 55 toward the exhaust port 62. The fluid is thus directed from the supply port 61 to the cylinder port 67. The piston portion 82 blocks the exhaust port 63, thereby preventing any escape of fluid, whereupon pressure builds up in the cylinder port 67, opening the check valve 71. The fluid then flows through the flexible hose 51 to the rear end of the cylinder, as viewed in Figure 1, acting to force the piston 44 forwardly in the cylinder 43, thereby lowering the plow. The fluid from the forward end of the cylinder 43 flows outwardly through the hose 52 and past the check valve 70, which has been forced open by a camming action of the conical portion 78 against the valve stem 76. The fluid flows through the cylinder port 66 into the valve chamber 55 and out through the exhaust port 62, returning to the reservoir through the duct 64. The lowering movement can be interrupted at any desired point by shifting the valve member 56 back to neutral position.

Figure 2:
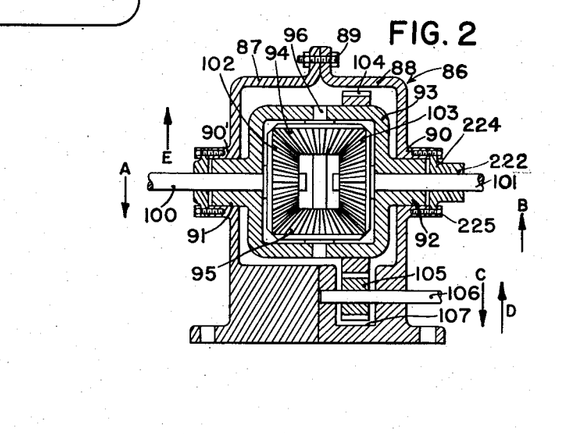
Figure 2 is a sectional elevational view taken through the axis of the differential gear mechanism.

The amount of slip of the tractor wheels 15, 16 is measured by comparing the peripheral speed of the wheels with the forward speed of the tractor over the ground. The present invention contemplates making this comparison by means of a differential gear mechanism as shown in Figure 2, comprising a differential housing 86 having a pair of cooperative flanged housing sections 87, 88 connected together by bolts 89 to the housing flanges. Each of the housing sections 87, 88 is provided with a bearing hub 90', 90, the hubs being adapted to receive a pair of trunnions 91, 92, respectively, of a differential cage member 93. The cage member 93 carries a pair of pinions 94, 95 therein, the pinions being journaled on a shaft 96, which extends diametrically through the cage 93 and is supported at opposite ends thereof, respectively, in the walls of the cage. The trunnions 91, 92 are provided with axially spaced openings to receive a pair of movable elements, herein drive shafts 100, 101 journaled therein. On the inner ends of the drive shafts 100, 101 are fixed a pair of differential gears 102, 103, disposed in mesh with the two pinions 94, 95.

As is well known to those skilled in the art, when the shaft 100 is turned in one direction of rotation at a given speed and the other drive shaft 101 is turned in the opposite direction at the same speed, the pinions 94, 95 are driven in relatively opposite directions, but the cage 93 remains stationary. When the shaft 100 is driven at a greater speed of rotation than the other shaft 101, however, the cage 93 is rotated in one direction at a speed which is one-half the difference between the speeds of the two shafts 100, 101. Conversely, when the shaft 100 turns at a slower speed than the other shaft 101, the cage 93 rotates in the opposite direction at a speed equal to half the difference between the speed of the shafts 100, 101.

The cage 93 is provided with a ring gear 104 extending peripherally around the outside of the cage 93 and disposed in mesh with a comparatively small pinion 105 mounted rigidly on a shaft 106. The pinion 105 is disposed within a recess 107 in one of the housing sections 88 and the shaft 106 is journaled in the housing section on opposite sides of the recess 107 and extends outwardly of the differential housing.

The differential shaft 100 is rotated in the direction of the arrow A (Figs. 1 and 2) at a speed proportional to the speed of forward travel of the tractor by means which will be described, while the other differential shaft 101 is driven at a speed proportional to the peripheral speed of the traction wheels 15, 16 in the other direction of rotation (arrow B, Figs. 1 and 2), with the result that the speed of the shaft 106 is an indication of the difference between the peripheral speed of the wheels 15, 16 and the forward speed of the implement, or in other words, the amount of slip of the tractor wheels 15, 16.

The forward speed of travel of the tractor is measured by means of a rotary motion-transmitting element or device, here a ground engaging wheel 110 fixed to an axle 111 journaled in a bearing 112 on a crank arm 113 swingably mounted in a bearing 114 on the tractor body 11. The crank arm 113 is free to swing in a vertical plane about the axis of the supporting bearing 114 to permit the wheel 110 to roll over the ground and to maintain contact therewith. The inner end of the axle 111 has a bevel gear 115 in mesh with a bevel gear 116. The gear 116 is connected through a flexible sheathed power transmitting cable drive 120 to drive a conical pulley 121 of an adjustable speed device 122. The other conical pulley 123 of the adjustable speed device 122 is connected to drive the shaft 100. The two conical pulleys 121, 123 face in relatively opposite directions and are interconnected by a power transmitting belt 124. The speed of the shaft 100 can be adjusted relative to the speed of the wheel 110 by shifting the flexible belt 124 axially of the conical pulleys 121, 123, as is well known to those skilled in the art. The mechanism for transmitting rotary motion from the ground wheel 110 to the shaft 100 with provision for adjusting the speed of the shaft 100 relative to the speed of the wheel 110 is not set forth in detail, for any suitable mechanism known to those skilled in the art can be used for this purpose. In any event, the drive mechanism 115, 116, cable 120, pulleys 121, 123 and belt 124 connect the wheel 110 and shaft 100 and the latter thus is means for indicating the forward speed of the vehicle over the ground.

The other differential shaft 101 is connected through a sheathed flexible power transmitting cable drive 130 to a bevel gear 131 in mesh with a bevel drive gear 132 mounted on the tractor power shaft 18. Inasmuch as the two tractor axles 13, 14 are driven through differential gear mechanism in a conventional manner, the peripheral speeds of the two wheels 15, 16 are not necessarily equal, such as when making a turn, but the speed of the drive shaft 18 is proportional to the average of the peripheral speeds of the two wheels 15, 16. Thus, the shaft 18 is a movable (here rotary) motion-transmitting device or element that moves (or rotates) at a speed proportional to the peripheral speed of the traction wheel means, and the shaft 101 is means for indicating the peripheral speed of the traction wheel means.

If the speed of one of the differential shafts 100 were to be made directly proportional to the peripheral speed of the ground wheel 110 in exactly the same ratio that the other differential shaft 101 is proportional to the average peripheral speed of the two traction wheels 15, 16, the rotary indicating shaft 106 would stand stationary only when there is no slip of the traction wheels 15, 16 during operation. In such case, the speed of rotation of the indicating shaft 106 would then be directly proportional to the amount of slip of the tractor wheels when the tractor is operating under load. For the purposes of the present invention, however, it is desirable to so construct and arrange the mechanism that the indicating shaft 106 is stationary when the tractor wheels 15, 16 are slipping at a normal predetermined value. This can be adjusted by shifting the belt 124 on the adjustable speed device 122 to bring the speed of rotation of the differential shaft 100 and gear 102 to a value equal to the speed of the differential shaft 101 and gear 103 under the desired load and ground conditions under which the tractor is to be operated.

Thus it will be evident that if the adjustable speed device 122 is adjusted to bring the indicating shaft 106 to a stationary condition while the tractor is being driven forwardly with the plow in operating position at the proper depth, then should the draft of the plow increase or the tractor wheels encounter a slippery spot in the field, the slip of the tractor wheels 15, 16 will increase, causing the indicating shaft 106 to begin to rotate in the direction of the arrow C (Figs. 2, 3, 5 and 6). Conversely, should the plow encounter lighter soil conditions, the draft force will decrease, resulting in less slip of the tractor wheels 15, 16, whereupon the indicating shaft 106 will begin to rotate in the opposite direction (arrow D, Figs. 2, 3, 5 and 6).

The rotary indicating shaft 106 extends into the control housing 50 and is supported in a pair of spaced bearings 135, 136 carried on a pair of brackets 137, 138, the latter being secured to the wall of the housing. A spur gear 139 is rigidly mounted on the indicating shaft 106 between the two bearings 135, 136 and is in mesh with a smaller spur gear 140 fixed to a countershaft 141. The countershaft 141 is journaled in a pair of bearings 142, 143, which are carried on a pair of brackets 144, 145, respectively, secured to the wall of the housing 50. The indicating shaft 106 is disposed in alignment with an actuating shaft 150, carried in a bearing 151 mounted on a bracket 152 which is supported on the wall of the housing 50. The actuating shaft 150 carries an actuating arm 153 rigidly secured thereto. The actuating arm 153 extends upwardly and is bifurcated to straddle the actuating rod 57 of the valve member 56. The ends of the arm 153 are provided with vertical slots 154, which are connected to the rod 57 by a pin 155 which extends through the slots 154 and through an aperture 156 in the rod 57. Thus, it is evident that angular movement of the actuating shaft 150 about its axis in relatively opposite directions will act through the arm 153 to shift the valve member 56 in either direction within the valve chamber 55 from the neutral position of the valve member, as shown in Figure 4. A pair of opposed coil springs 156$^a$ are connected at their inner ends to the actuating arm 153 and at their outer ends to brackets 157 secured to one of the walls of the housing 50. Hence, the springs 156$^a$ tend to center the valve member 56 in its neutral position.

The actuating shaft 150 is provided with a friction clutch disk 160 mounted rigidly on the inner end of the shaft 150 in operative relation to a friction clutch disk 161 which is mounted on a hub 162 slidable axially on the indicating shaft 106 but prevented from rotating on the shaft 106 by a suitable splined connection 163. The hub 162 is grooved peripherally at 164 to receive a shifting fork 165, which is pivotally mounted on a supporting pin 166 carried on a bracket 167, which is fixed to one of the housing walls. The upper end of the shifting fork 165 is also bifurcated at 168 to engage a peripheral groove 169 in a sleeve 170 which is slidable axially along the countershaft 141. The sleeve 170 forms a part of a speed responsive device or mechanism such as a governor 171 of the flyball type, which also includes a sleeve or hub 172 fixed to the shaft 141 and connected to the slidable sleeve 170 by two pairs of toggle links 173, which are provided with flyballs or weights 174 at their intermediate joints, following conventional construction. A coil spring 175 encircles the countershaft 141 between the hub 172 and the sleeve 170, tending to force them apart and to swing the shifting fork 165 in a clockwise direction about its pivot pin 166, and thereby separating the clutch plates 160, 161.

When the countershaft 141 is rotated in either direction, the flyballs 174 are thrown outwardly by centrifugal force and compress the spring 175 by pulling the sleeve 170 toward the hub 172, thereby swinging the shifting fork 165 in a counterclockwise direction (to the left in Fig. 3) to engage the friction disks 160, 161. The clutch disks thus transmit rotary motion from the indicating shaft 106 to the actuating shaft 150, thereby swinging the actuating arm 153 in one direction or the other, depending upon the direction of rotation of the indicating shaft 106. This shifts the valve member 56 to direct fluid under pressure to one end or the other of the cylinder 43, thereby raising or lowering the plow.

The operation of this embodiment of my invention is as follows: The adjustable speed device 122 is so adjusted by shifting the belt 124, that under the average plowing conditions of any particular situation, the indicating shaft 106 is stationary. Under these assumed normal conditions of load and ground surface, the slip of the tractor wheels 15, 16 will remain substantially constant, generally between five and ten per cent. With the indicating shaft 106 stationary, the countershaft 141 is also stationary since it is geared thereto by the gears 139, 140. The spring 175 urges the sleeve 170 away from the hub 171, thereby separating the clutch disks 160, 161, and permitting the centering springs 156ᵃ to hold the valve member 56 in the neutral position. Both of the check valves 70, 71 are closed and therefore the piston 44 is locked against movement in either direction in the cylinder 43, thereby holding the plow at its given depth of operation. Any change in the ground conditions which tend to overload the tractor, such as an increase in density in the land being plowed, an upward slope to the ground, or slippery ground conditions, all tend to cause the forward speed of the tractor to decrease, or the speed of the tractor wheels 15, 16 to increase, or both. In any case, the speed of the movable element or differential shaft 100 decreases relative to the speed of the differential shaft 101, thereby causing the differential cage 93 to rotate in the direction of the arrow E (Fig. 2), thereby causing the indicating shaft 106 to be driven through the gears 104, 105 in the direction of the arrow C (Figs. 2, 3, 5 and 6). The gear ratio is such that the indicating shaft 106 rotates at a higher speed than the cage 93, which drives the countershaft 141 at a still higher speed. When the speed of the flyball governor 171 overcomes the pressure of the spring 175, the clutch plate 161 is shifted into contact with the clutch plate 160, and since the shaft 106 is turning in its clockwise direction, as viewed in Figure 3 (arrow C) the motion is transmitted through the clutch plates to the actuating shaft 150, which swings the actuating arm 153 to shift the valve member 56 in its "raise" direction, or to the right, as viewed in Figures 3 and 4. This directs fluid under pressure through the hose 52 to the forward end of the cylinder 43 and extends the piston rod 45 thereby forcing the wheels 33, 34 downwardly and raising the plowshares 29. Decreasing the depth of operation of the plowshares has the effect of relieving the load on the tractor, permitting the latter to increase its forward speed and to decrease the amount of slip of the tractor wheels 15, 16. This causes the indicating shaft 106 to slow down to a point at which the spring 175 will overcome the centrifugal force of the flyballs 174 and separate the clutch plates 160, 161, thereby permitting the springs 156ᵃ to center the actuating arm 153 and the valve member 56 in neutral position. The slip of the tractor wheels 15, 16 has now been brought back to the normal value, which was determined by the setting of the adjustable speed device 122 when the implement was operating under the assumed average operating conditions. Thus, the valve means 53 and mechanism of Fig. 3 comprise means responsive to variations in the speed of the element 100 for controlling the shifting means or cylinder and piston assembly 43, 44 to selectively increase or decrease the the working tool. Stated otherwise, this means reflects variations in the speed of forward travel of the implement for controlling the working depth of the plow bottom. The valve mechaism of Fig. 4 is representative of one from of means responsive to the reflecting means for controlling the tool-shifting means 43—44.

After the overload conditions have been removed, such as, for example, by the plow encountering lighter soil or by the tractor wheels leaving the slippery ground surface and obtaining better traction once more, then the amount of wheel slipping will be decreased below its normal value, in view of the lighter load on the tractor occasioned by the plow operating at reduced depths. In other words, the forward speed of the tractor would be increased relative to the speed of the wheels and the speed of the shaft 100 would exceed that of the shaft 101, thereby causing the shaft 106 to begin to rotate in the direction of the arrow D, as viewed in Figures 2, 3, 5 and 6. The rotation of the counter shaft 141 will again cause the shifting fork 165 to engage the clutch disks 160, 161. The "D" rotation of the shaft 106 is transmitted through the clutch to swing the actuating shaft 150 and arm 153 in a counterclockwise direction (as seen in Fig. 3), thereby shifting the valve member 56 toward the left, as viewed in Figures 3 and 4, directing hydraulic fluid under pressure through the hose 51 to retract the piston rod 45 for lowering the plow into the ground. This results in an increased drag on the tractor so that the slip increases again to its normal value, causing the indicating shaft 106 to be brought to a standstill, thereby separating the clutch disks 160, 161, and permitting the springs 156ᵃ to again center the valve member 56 in neutral position.

It is to be noted that although a change of wheel slippage results in a continuous rotation of the indicating shaft 106 in one direction (under one condition or the other), the actuating shaft 150 and actuating arm 153 can rotate through only a comparatively small angle until the valve member 56 reaches the end of its range of shifting movement within the valve casing 54. Further rotation of the indicating shaft 106 is accommodated by the clutch plate 161 slipping relative to the clutch plate 160, the latter remaining stationary until the speed of rotation of the indicating shaft 106 decreases to the point where the governor mechanism 171 separates the plates 160, 161, whereby the centering springs 156ᵃ are permitted to return the valve member 56 to neutral position.

Figures 5, 6:
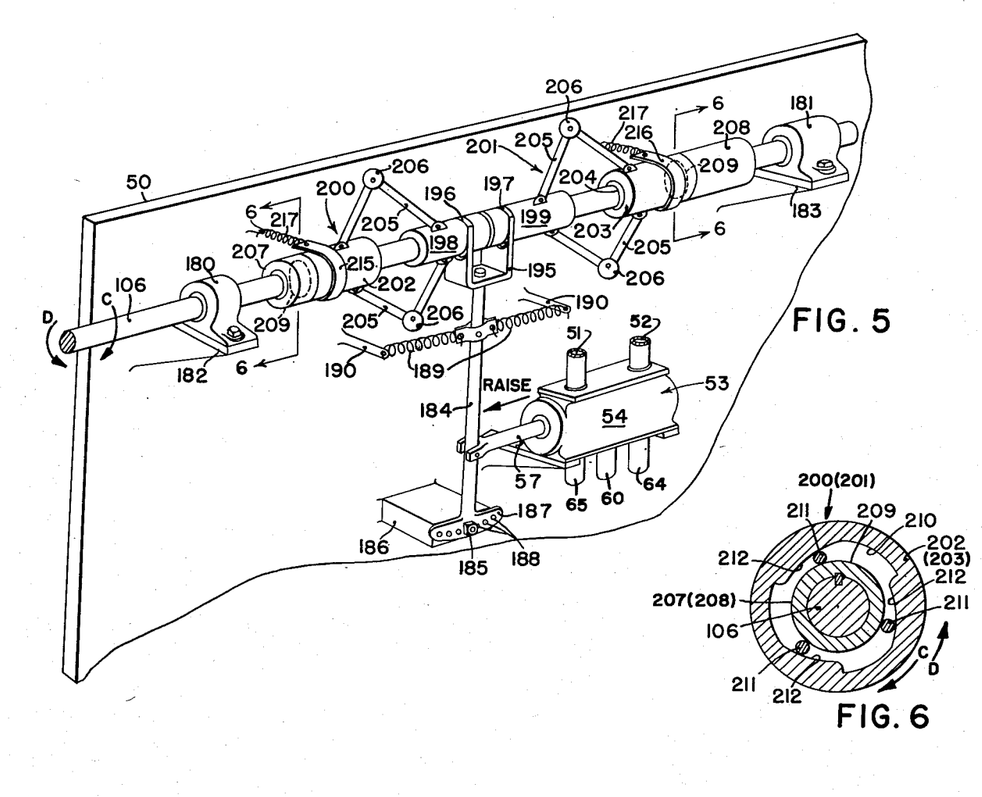
Figure 5 is a perspective view of a modified form of the control mechanism.
Figure 6 is a sectional elevational view of either of the two overrunning clutch devices in Figure 5, as indicated by lines 6—6 in Figure 5.

Referring now more particularly to Figures 5 and 6, the modified form of the present invention includes the rotary indicating shaft 106 which is supported in a pair of laterally spaced journal bearings 180, 181, which are mounted on a pair of supporting brackets 182, 183, respectively, carried by a wall of the control housing 50. In this embodiment the actuating arm 184, to which the actuating rod 57 of the valve member 56 is connected, is pivotally mounted on a bolt 185 which is supported on a boss 186 extending outwardly from the wall of the housing 50.

The lower end of the actuating arm 184 is provided with a transversely extended portion 187 in which is provided a plurality of laterally spaced apertures 188 to receive the pivot bolt 185. The actuating arm 184 and the valve member 56 are centered in neutral position by means of a pair of centering springs 189 connected in opposed relation to the arm 184 and anchored to a pair of brackets 190 on opposite sides of the arm, respectively. The upper end of the actuating arm 184 is provided with a U-shaped shifting member 195, having two upwardly extending legs which engage a pair of grooves 196, 197 in a pair of sleeves 198, 199, respectively. The sleeves 198, 199 are loosely and slidably mounted on the indicating shaft 106 and are also rotatable relative thereto and to each other. The sleeves 198, 199 are part of a pair of speed responsive devices 200, 201, respectively. Each of the devices 200, 201 also includes a second sleeve or hub member 202, 203, respectively, which is journaled on the shaft 106 but secured by a collar 204 to prevent axial shifting movement of the sleeves 202, 203. Each of the journaled sleeves 202, 203 is connected with its associated slotted sleeve 198, 199 by means of a plurality of pairs of toggle links 205 having weights or flyballs 206 connected to the intermediate joints between the links. Thus, it is evident that rotation of each of the speed responsive devices 200, 201 causes the flyballs 206 to move outwardly from the axis of the shaft 106 by centrifugal force, thereby tending to shift the sleeves 198, 199 away from each other toward the journaled sleeves 202, 203.

The drive means for the two speed responsive devices 200, 201, however, is so arranged that the speed responsive device 200 is rotated when the shaft 106 rotates in the direction of the arrow C (Figs. 2, 3, 5 and 6) and the other speed responsive device 201 is rotated when the shaft 106 rotates in the other direction (arrow D). This is accomplished by means of a pair of one way or overrunning clutches connected between the shaft 106 and the sleeves 202, 203 for driving the latter by rotation of the shaft 106 in opposite directions, respectively. Each of the speed responsive devices 200 and 201 is provided with a fixed hub 207, 208, which is rigidly fixed to the shaft 106 and is provided with a neck portion 209 of reduced diameter, which extends into a recess 210 in the outer end of the sleeve 202, 203, best shown in Figure 6. The neck portion 209 is of appreciably smaller diameter than the recess 210 to provide a space therebetween to receive three rollers 211 disposed generally parallel to the axis of the shaft 106. The inner surface of the recess 210 is provided with three clutch surfaces 212 which curve inwardly in converging relation to the outer surface of the reduced portoin or neck 209, between which converging surfaces the rollers 211 become wedged when the shaft 106 rotates in one direction of rotation. As viewed in Figure 6, when the shaft 106 and neck portion 209 rotate in a counterclockwise direction (arrow D), the rollers 211 are urged into wedging relation between the cylindrical surface of the neck portion 209 and the converging surface 212 to drive the hub 202 in a counterclockwise direction. However, when the shaft 106 and neck 209 are rotated in a clockwise direction (arrow C), the rollers 211 are urged out of wedging engagement into the enlarged space between the portion 209 and the hub 202, with the result that the latter is not rotated with the shaft.

It will be noted that Figure 6 represents sections taken along either of two lines 6—6 in Figure 5, looking in opposite directions relative to the shaft 106 and therefore it is evident that when the shaft rotates in a clockwise direction, arrow C, as viewed in Figure 5, as a result of decrease in ground speed of the tractor, the speed responsive device 200 is rotated with the shaft 106, while the other speed responsive device 201 is disconnected from the shaft 106 and therefore stands stationary. Rotation of the device 200 with the shaft 106 causes the flyballs 206 to be urged outwardly, thereby drawing the sleeve 198 toward the left along the shaft 106, as viewed in Figure 5, thereby swinging the actuating arm 184 toward the left about its pivot mounting 185 and shifting the valve actuating rod 57 outwardly (or in its "raise" direction) from the valve casing 54. When the shaft 106 is brought to a standstill, the springs 189 center the actuating arm 184 and thus shift the valve member 56 back to neutral position. It will be noted that when the actuating arm 184 is shifted toward the left by the speed responsive device 200, the sleeve 199 of the other device 201 is shifted along the shaft 106 by the fork 195 but no rotation of the device 201 takes place.

Conversely, when the indicating shaft 106 rotates in a counterclockwise direction (arrow D, Figs. 5 and 6), the device 200 does not rotate with the shaft, but the overrunning clutch of the speed responsive device 201 engages to drive the latter in a counterclockwise direction with the shaft 106. The centrifugal force acting upon the flyballs 206 causes the sleeve 199 and actuating arm 184 to be drawn toward the right, as viewed in Figure 5, thereby shifting the valve actuating rod 57 inwardly of the valve casing 54.

In order to prevent the speed responsive devices from idly rotating on the shaft 106 when they are not being driven thereby, a pair of brake bands 215, 216 are provided in contact with the sleeves 202, 203 of the devices 200, 201, respectively. Each of the brake bands 215, 216 is trained over its respective hub or sleeve 202, 203 and one end of the brake band is suitably anchored to the housing wall 50 while the other end is connected through a spring 217 to the housing wall 50. The brake bands also prevent the speed responsive devices from coasting after the indicating shaft 106 has been brought to rest.

In this embodiment of my invention, the operation is generally similar to that explained in connection with the preceding embodiment. When the implement is operating at its predetermined normal speed and under the average ground conditions, the indicating shaft 106 stands stationary, but an increase in the wheel slip, or in other words, the difference between the peripheral speed of the tractor wheels 15, 16 and the forward motion of the tractor, will cause the shaft 106 to rotate in a clockwise direction (arrow C, Fig. 5), driving the speed responsive device 200 through its overrunning clutch and shifting the valve actuating rod 57 outwardly of the valve casing 54, causing the hydraulic cylinder 43 to raise the plow. After the section of dense soil has been passed and the wheel slippage decreases, the shaft 106 will rotate in a counterclockwise direction (arrow D, Fig. 5), thereby driving the speed responsive device 201 through its associated one-way clutch, thereby shifting the valve actuating rod 57 inwardly of the valve casing 54 to lower the plow, until the normal value of wheel slippage has been reestablished.

Figure 7:
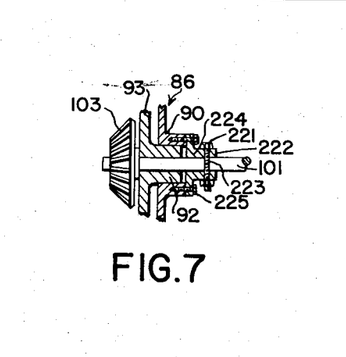
Figure 7 is a view similar to a portion of Figure 2 but showing a further modification of the invention.

A third and simplified embodiment of my invention can be provided for tractors which are equipped with governors operating on the fuel feed of the tractor to hold the tractor engine speed at a predetermined constant value in any conventional manner. The governor of the tractor is indicated by the reference numeral 220 in Figure 1 and serves to regulate the fuel feed so that the speed of the drive shaft 18 is substantially constant. In this case, therefore, the indication of the tractor drive shaft speed can be dispensed with, thereby making it possible to eliminate the differential gear mechanism entirely, although the arrangement shown in Figures 1, 2, 5 and 6 can be employed by inserting a lock bolt 221, as shown in Figure 7 through aligned apertures in a hub 222, which can be aligned with a drilled opening 223 through the shaft 101. The hub 222 is provided with a flange 224 which is connected by bolts 225 to the hub 90 of the housing 86. The bevel gears 131, 132 should also be disengaged from each other so that the differential shaft 101 is now locked in a stationary position, while the forward speed of the tractor over the ground is measured by the ground wheel 110 and applied through the gear 102, the pinions 94, 95, and the cage 93 to the ring gear 104, which drives the indicating shaft 106 always in the direction of the arrow D (Figs. 2, 5 and 6) through the pinion 105. It will now be apparent that the indicating shaft 106 will be driven at a speed which is proportional to the speed of the ground wheel 110 or, in other words, the forward speed of the tractor. Inasmuch as the shaft 106 will turn in one direction at all times (arrow D, Figs. 2, 5 and 6), it is necessary to adjust the apparatus so that the valve element 56 will be in neutral position when the tractor is travelling forward under load at its normal speed. This can be accomplished by changing the position of the fulcrum of the actuating arm 184 by removing the pivot bolt 185 and inserting it through one of the other apertures 188 in the lower end of the arm 184. By driving the tractor forwardly the implement can be adjusted to its desired operating depth by shifting the flexible member 124 of the adjustable speed device 122 in an axial direction relative to the drive pulleys 121, 123.

During operation, when the plow encounters increased resistance to forward motion, the increased draft force is compensated by the tractor governor 220, which maintains the speed of the tractor drive shaft 18 at a substantially constant value. An appreciable overload will, however, result in an increased slip of the tractor wheels 15, 16, which is manifested by a slowing down of the tractor over the ground. This causes the speed of rotation of the indicating shaft 106 to decrease, thereby causing the speed responsive device 201 in conjunction with the springs 189 to shift the actuating arm 184 to raise the plow until the draft force approaches its normal value. When the load is relieved from the tractor, the slip of the wheels decreases, resulting in a slightly greater forward speed of the tractor over the ground, thereby turning the indicating shaft 106 at a greater speed, which shifts the actuating arm 184 to lower the plow.

With this embodiment, when the tractor encounters a slippery spot, the forward speed of the tractor will decrease due to the increased slip of the wheels, which will effect a raising of the plow to permit the tractor to pull the latter with decreased soil resistance.

I do not intend my invention to be limited to the particular details shown and described herein, except as set forth in the claims which follow. The principles of my invention may be applied to the control of any implement propelled by a tractor, whether the implement trails behind the tractor, is mounted upon the latter, or is pushed thereby.

I claim:

1. In combination with a draft vehicle having traction wheel means, an agricultural implement draft-connected to the vehicle for travel therewith and comprising a ground working tool shiftable within a range of depths of ground working operation and thereby varying the draft requirements of the tool, power actuated means for shifting said tool, means for indicating the forward speed of said vehicle over the ground, means for indicating the peripheral speed of said traction wheel means, and means comprising a differential mechanism connected with said two indicating means for controlling said tool shifting means to maintain a substantially constant slippage of said traction wheel means.

2. In combination with a draft vehicle having traction wheel means, an agricultural implement draft-connected to the vehicle for travel therewith and comprising a ground working tool shiftable within a range of depths of ground working operation and thereby varying the draft requirements of the tool, power actuated means for shifting said tool, a first movable motion-transmitting device engageable with the ground to move at a speed proportional to the forward speed of the implement, a second movable motion-transmitting device connected with said traction wheel means to move at a speed proportional to the peripheral speed of the latter, a three-way gear mechanism comprising three differentially related elements, two of which are connected with said motion-transmitting devices, respectively, to cause the third of said elements to move at a speed proportional to the difference between the forward speed of said implement and the peripheral speed of said traction wheel means, and means connected with said third element for controlling said tool shifting means.

3. In combination with a draft vehicle having traction wheel means, an agricultural implement draft-connected to the vehicle for travel therewith and comprising a ground working tool shiftable within a range of depths of ground working operation and thereby varying the draft requirements of the tool, power actuated means for shifting said tool, a first movable motion-transmitting device engageable with the ground to move at a speed proportional to the forward speed of the implement, a second movable motion-transmitting device connected with said traction wheel means to move at a speed proportional to the peripheral speed of said traction wheel means, a three-way gear mechanism comprising three differentially related movable elements, two of which are connected with said motion-transmitting devices, respectively, to cause the third of said elements to move at a speed proportional to the difference between the forward speed of said implement and the peripheral speed of said traction wheel means, an actuating member for controlling said tool shifting means, a clutch engageable to connect said third differential element with said actuating member, and means associated with and responsive to movement of said third differential element to engage and disengage said clutch.

4. In combination with a draft vehicle having traction wheel means, an agricultural implement connected to the draft vehicle to be propelled thereby and comprising a ground working tool shiftable within a range of depths of ground working operation and thereby varying the draft requirements of the tool, power actuated means for shifting said tool, a first movable motion-transmitting device engageable with the ground to move at a speed proportional to the forward speed of the implement, a second movable motion-transmitting device connected with said traction wheel means to move at a speed proportional to the peripheral speed of said traction wheel means, a three-way gear mechanism comprising three differentially related movable elements, two of which are connected with said motion-transmitting devices, respectively, to cause the third of said elements to move at a speed proportional to the difference between the forward speed of said implement and the peripheral speed of said traction wheel means, an actuating lever swingable through a limited range in opposite directions from a neutral position to control said tool shifting means to raise and lower said tool, respectively, a friction clutch engageable to connect asid third differential element with said lever for swinging said lever in either direction depending on the direction of movement of said third element, said clutch being adapted to slip to accommodate movement of said third element after said lever has been swung through its range of movement, means associated with and responsive to movement of said third differential element to engage and disengage said clutch, and means for returning said lever to said neutral position upon disengagement of said clutch.

5. In combination with an agricultural implement having an adjustable ground working tool shiftable within a range of depths of ground working operation and thereby varying the speed of forward travel of said implement, power actuated means for shifting said tool, a movable motion-transmitting element the speed of movement of which is influenced by said speed of forward travel of the implement, an actuating member for controlling said tool shifting means, a clutch engageable to connect said motion-transmitting element with said actuating member, and a speed responsive device associated with and responsive to movement of said motion-transmitting element to engage and disengage said clutch.

6. In combination with an agricultural implement having an adjustable ground working tool shiftable within a range of depths of ground working operation and thereby varying the speed of forward travel of said implement, power actuated means for shifting said tool, a movable motion transmitting element the speed of movement of which is influenced by said speed of forward travel of the implement, an actuating member for controlling said tool shifting means, said member being shiftable from a neutral position in relatively opposite directions to raise and lower said tool, respectively, said motion transmitting element being adapted to stand stationary when the tool is operating at its correct depth of ground engagement under the existing draft conditions and to move in one direction or the other when the tool is operating at too great or small a depth, respectively, a clutch engageable to connect said motion-transmitting element with said actuating member to shift the latter in either direction, speed responsive means energized by movement of said motion-transmitting element to engage said clutch, and means for returning said actuating member to said neutral position upon disengagement of said clutch.

7. In combination with an agricultural implement having an adjustable ground working tool shiftable within a range of depths of ground working operation and thereby varying the speed of forward travel of said implement, power actuated means for shifting said tool, a movable motion-transmitting element the speed of movement of which is influenced by said speed of forward travel of the implement, an actuating member for controlling said tool shifting means, and a speed responsive device connected with said member and with said motion-transmitting element and responsive to changes in speed of the latter above and below a predetermined normal value for adjusting said member to shift said tool to maintain the speed of said motion-transmitting element at said normal value.

8. In combination with an agricultural implement having an adjustable ground working tool shiftable within a range of depths of ground working operation and thereby varying the speed of forward travel of said implement, power actuated means for shifting said tool, a movable motion-transmitting element the speed of movement of which is influenced by said speed of forward travel of the implement, an actuating member for controlling said tool shifting means, said member being shiftable from a neutral position in relatively opposite directions to raise and lower said tool, respectively, said motion-transmitting element being adapted to stand stationary when the tool is operating at its correct depth of ground engagement under the existing draft conditions and to move in one direction or the other when the tool is operating at too great or small a depth, respectively, speed responsive mechanism having a drive connection to the motion-transmitting element to be driven by said motion-transmitting element and connected with said actuating member to shift the latter in one direction or the other responsive to movement of said motion transmitting element in one direction or the other, respectively.

9. In combination with an implement movable forwardly over the ground and having an adjustable ground-working tool shiftable within a range of depths of ground-working operation and thereby varying the speed at which said implement can travel, power-actuated means for shifting said tool, a movable element caused to move by forward travel of the implement so that the speed of movement of said element is proportional to the speed of forward travel of said implement, and means responsive to variations in the speed of movement of said element for controlling said shifting means to selectively increase or decrease the depth of said ground-working tool according to whether the speed of movement of said element reflects respectively increase or decrease in the speed of forward travel of said implement.

10. In combination with an implement movable forwardly over the ground and having an adjustable ground-working tool shiftable within a range of depths of ground-working operation and thereby varying the speed of forward travel of said implement, power-actuated means for shifting said tool, a movable element caused to move by forward travel of the implement so that the speed of movement of said element is proportional to the speed of forward travel of the implement, and means responsive to variations in the speed of movement of said element that reflect variations in speed of forward travel of the implement for controlling said shifting means to adjust the working depth of said tool so that the speed of movement of said element is maintained substantially at a predetermined value.

11. In combination with an implement movable forwardly over the ground and having an adjustable ground-working tool shiftable within a range of depths of ground-working operation, power-actuated means for shifting said tool, ground-engaging means for measuring the forward speed of the implement relative to the ground, including means actively reflecting variations in the forward speed of the implement, and means responsive to said reflecting means for controlling said shifting means to adjust the depth of operation of said ground-working tool.

12. In combination with an implement movable forwardly over the ground and having an adjustable ground-working tool shiftable within a range of depths of ground-working operation to vary the ground resistance to said tool and hence reducing or increasing the forward speed of the implement by adjusting the drag thereon, a ground-engaging wheel for measuring the forward speed of the implement relative to the ground, a speed-responsive governor connected to said wheel to be driven thereby for reflecting speed variations in said wheel, and power-actuated means controlled by said governor for controlling the shifting of said tool to hold a substantially constant speed of forward travel.

13. In combination with a draft vehicle powered for travel over the ground by a ground-engaging traction element subject to slip relative to the ground in larger or smaller amounts and thus respectively to cause decrease or increase in the travel speed of the vehicle according respectively to increase or decrease in draft load imposd on the vehicle; an agricultural implement draft-connected to the vehicle for travel therewith and having an agricultural working part selectively adjustable to and settable in different phases of operating effectiveness and adapted, in any selected phase, to encounter agricultural conditions of varying magnitude imposing varying resistances to travel of said part with the vehicle and accordingly imposing varying draft loads on the vehicle such as to affect the ratio of vehicle travel speed to slip of the traction element relative to the ground; power actuated means connected to the working part and controllable to adjust and set the working part in different phases of operating effectiveness; means associated with the vehicle for reflecting variations in the ratio of vehicle travel speed to slip of the traction element relative to the ground; and means connected between said ratio-reflecting means and the power actuated means for controlling said power actuated means to respectively decrease and increase the operating effectiveness of the working part according to decrease and increase in the ratio of vehicle travel speed to slip of the traction element relative to the ground.

14. For an agricultural unit including a draft vehicle powered for travel over the ground by a ground-engaging traction element subject to slip relative to the ground in larger or smaller amounts and thus respectively to cause decrease or increase in the travel speed of the vehicle according respectively to increase or decrease in draft load imposed on the vehicle, an agricultural implement draft-connected to the vehicle for travel therewith and having an agricultural working part selectively adjustable to and settable in diffeernt phases of operating effectiveness and adapted in any selected phase to encounter agricultural conditions of varying magnitude imposing varying resistances to travel of said part with the vehicle and accordingly imposing varying draft loads on the vehicle such as to affect the ratio of vehicle travel speed to slip of the traction element relative to the ground, and power actuated means connected to the working part and controllable to adjust and set the working part in different phases of operating effectiveness, the improvement comprising: means connectible with the vehicle for reflecting variations in the ratio of vehicle travel speed to slip of the traction element relative to the ground; and means connectible between said ratio-reflecting means and the power actuated means for controlling said power actuated means to respectively decrease and increase the operating effectiveness of the working part according to decrease and increase in the ratio of vehicle travel speed to slip of the traction element relative to the ground.

15. In combination with a draft vehicle powered for travel over the ground by a ground-engaging traction element and subject to decrease or increase in the travel speed according respectively to increase or decrease in draft load imposed on the vehicle; an agricultural implement draft-connected to the vehicle for travel therewith and having an agricultural working part selectively adjustable to and settable in different phases of operating effectiveness and adapted, in any selected phase, to encounter agricultural conditions of varying magnitude imposing varying resistances to travel of said part with the vehicle and accordingly imposing varying draft loads on the vehicle such as to affect the travel speed of the vehicle; power actuated means connected to the working part and controllable to adjust and set the working part in different phases of operating effectiveness; means associated with the vehicle for reflecting variations in the travel speed of the vehicle; and means connected between said reflecting means and the power actuated means for controlling said power actuated means to respectively decrease and increase the operating effectiveness of the working part according to decrease and increase in the vehicle travel speed.

16. For an agricultural unit including a draft vehicle powered for travel over the ground by a ground-engaging traction element and subject to decrease or increase in the travel speed according respectively to increase or decrease in draft load imposed on the vehicle, an agricultural implement draft-connected to the vehicle for travel therewith and having an agricultural working part selectively adjustable to and settable in different phases of operating effectiveness and adapted in any selected phase to encounter agricultural conditions of varying magnitude imposing varying resistances to travel of said part with the vehicle and accordingly imposing varying draft loads on the vehicle such as to affect the travel speed of the vehicle, and power actuated means connected to the working part and controllable to adjust and set the working part in different phases of operating effectiveness, the improvement comprising: means connectible with the vehicle for reflecting variations in the travel speed of the vehicle; and means connectible between said reflecting means and the power actuated means for controlling said power actuated means to respectively decrease and increase the operating effectiveness of the working part according to decrease and increase in the vehicle travel speed.

17. For an agricultural unit including a draft vehicle having traction means provided with a rotary part, an agricultural implement draft-connected to the vehicle for travel therewith and having a ground-working tool shiftable within a range of depths of ground-working operation and thereby varying the draft requirements of the tool, and power actuated means for shifting the tool, the improvement comprising: a first movable motion-transmitting device connectible to the unit for movement at a speed proportional to the forward speed of the unit; a second movable motion-transmitting device connectible to the aforesaid rotary part to move at a speed proportional to the peripheral speed of the traction element; a three-way gear mechanism including three differentially related movable elements, two of which are connected respectively with said motion-transmitting devices to cause the third of said elements to move at a speed proportional to the difference between the forward speed of the unit and the peripheral speed of the traction element, an actuating member for controlling said tool shifting means; a clutch engageable to connect said third differential element with said actuating member; and means associated with and responsive to movement of said third differential element to engage and disengage said clutch.

18. The invention defined in claim 8, in which: the speed responsive mechanism comprises a pair of drivable speed responsive devices respectively connected with the actuating member to shift said actuating member in relatively opposite directions, respectively; and the drive connection of the speed responsive mechanism to the motion-transmitting element includes a pair of opposed one-way clutch devices drivingly connecting said speed responsive devices with said motion-transmitting element and providing for transmitting motion from said motion-transmitting element to said speed responsive devices, selectively, by movement of said motion-transmitting element in relatively opposite directions, respectively.

19. The combination set forth in claim 18, including the further provision of a pair of braking means, one for each of said speed responsive devices, for respectively holding one of the devices stationary while the other is being driven by said motion-transmitting element, and opposed biasing means connected with said actuating member for returning the latter to said neutral position when said motion-transmitting element stops moving.

THOMAS W. BOHMKER.

References Cited in the file of this patent

UNITED STATES PATENTS

| Number | Name | Date |
|---|---|---|
| 718,221 | Schmitthenner | Jan. 13, 1903 |
| 739,386 | Cady | Sept. 22, 1903 |
| 841,318 | Foster | Jan. 15, 1907 |
| 886,910 | Williams et al. | May 5, 1908 |
| 1,931,815 | Conley | Oct. 24, 1933 |
| 2,016,626 | Constantinesco | Oct. 8, 1935 |
| 2,356,231 | Ferguson | Aug. 22, 1944 |
| 2,363,292 | Brown | Nov. 21, 1944 |
| 2,394,210 | Sherman | Feb. 5, 1946 |
| 2,405,334 | Silver | Aug. 6, 1946 |
| 2,423,057 | Thomas et al. | June 24, 1947 |
| 2,430,696 | Acton | Nov. 11, 1947 |

FOREIGN PATENTS

| Number | Country | Date |
|---|---|---|
| 541,436 | Great Britain | Nov. 26, 1941 |
| 42,266 | Switzerland | Dec. 24, 1907 |